United States Patent Office 3,246,955
Patented Apr. 19, 1966

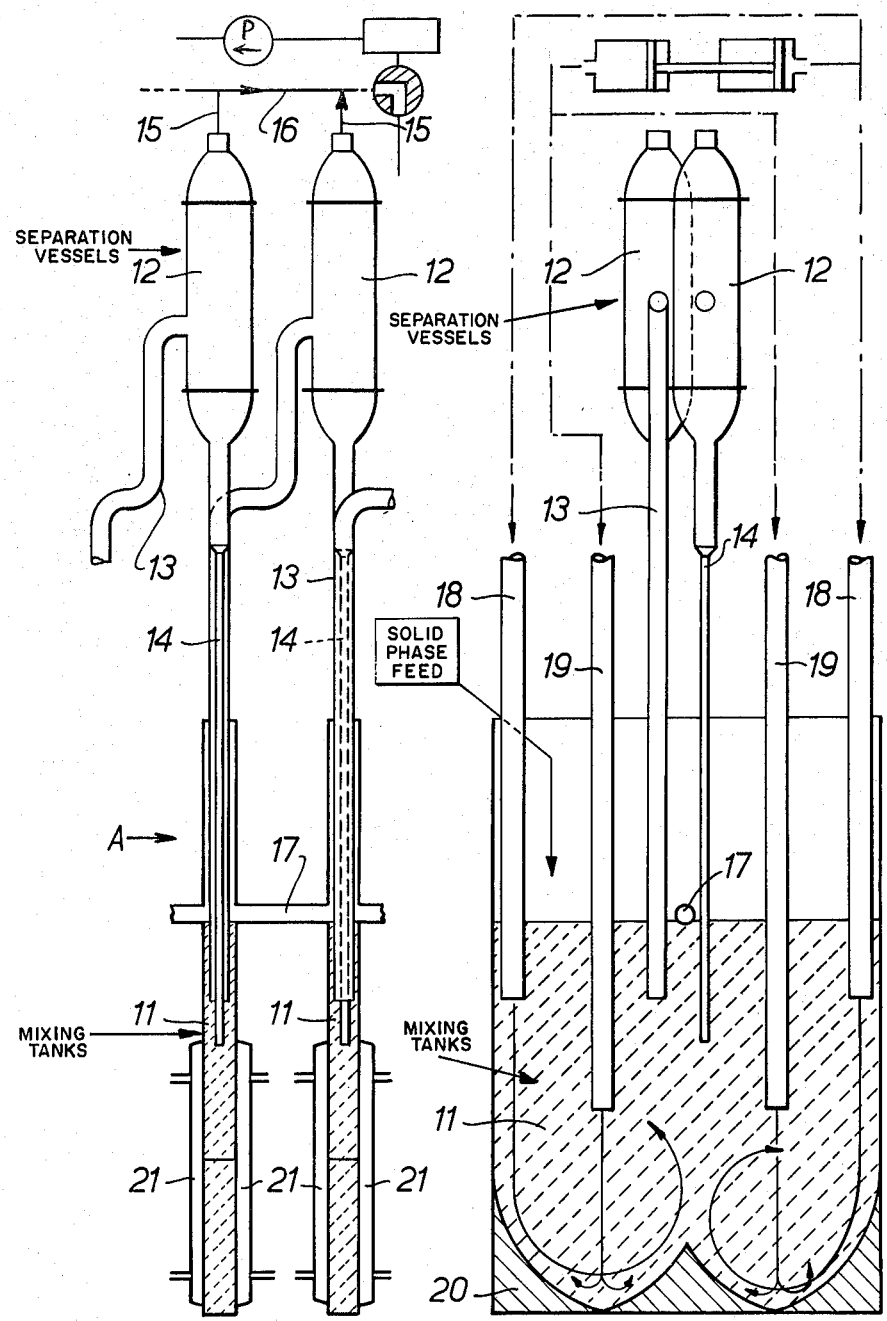

3,246,955
APPARATUS FOR COUNTER CURRENT CONTROL OF A SOLID WITH A LIQUID
Kenneth Hartley, John Lindley, and John M. B. Bleazard, Thurso, Caithness, Scotland, assignors to United Kingdom Atomic Energy Authority, London, England
Filed Dec. 3, 1962, Ser. No. 241,861
Claims priority, application Great Britain, Dec. 13, 1961, 44,615
3 Claims. (Cl. 23—270)

The present invention relates in general to chemical extraction processes by which one or more components are exchanged between contacting media. More particularly, the invention is concerned with extraction from a solid to a liquid phase, as in a leaching process.

Leaching processes entail a solid residue which has to be removed from the vessel in which the process is being carried out. The removal of such residue is a problem in radioactive conditions and thus, to quote a particular case, becomes an obstacle to the adoption of a leaching process for the dissolution in nitric acid of unconsumed fissile material in irradiated nuclear fuel of the type where the fissile material is dispersed in a matrix which is at least partially insoluble; in this case the insoluble residue is radioactive and the handling of it raises difficulties. The difficulty of handling is illustrated by the complication of previously proposed expedients for dealing with this problem; one proposal is to have in the process vessel a basket which will retain the insoluble residue and which can be withdrawn to dispose of it; another proposal is to install in the process vessel a vibratory feeder which causes the gradual ascent of the solid material to a point of discharge in the head of the vessel.

According to the present invention, a method of contacting solid and liquid phases of differing densities by progression of the solid phase in comminuted form through alternating mixer and settler sections in countercurrent relationship with the liquid phase, comprises periodically lifting a quantity of mixed phases into each settler section from the preceding mixer section, allowing separation of the phases to take place in the settler sections, and discharging the settled phases, the liquid back into the preceding mixer section and the solid forward into a following mixer section. As applied to the leaching with a leaching liquid, such as nitric acid, of the fissile component of irradiated nuclear fuel of the dispersion type, the invention provides a method comprising the steps of comminuting the fuel, feeding the comminuted fuel as a solid phase to a first mixer section of a series of mixer sections containing the leaching liquid phase, agitating the contents of the mixer sections, lifting a quantity of mixed phases from a mixer section to a settler section at a higher level, allowing separation of the phases to take place in the settler section, discharging the settled phases from the settler section, the liquid back to the same mixer section and the solid forward to a following mixer section in the series, and cyclically repeating the lifting, settling and discharging to progress the solid phase through the series of mixer sections. At the end of the series of sections, the solid phase represents the insoluble residue which can be drained off with only a small amount of liquid phase accompanying it.

Further, according to the invention, a mixer settler apparatus, with which the aforementioned method is carried out, comprises settler sections alternating with and at a higher level than mixer sections, means for lifting mixed phases from the mixer sections to the settler sections, and means for delaying return of the phases from the settler sections to the mixer sections.

More particularly, such apparatus has for each settler section a first conduit extending to the preceding mixer section and a second conduit extending to a following mixer section, the first conduit opening into the settler section at a higher level than the second conduit. Lifting of the mixed phases is conveniently accomplished by displacement with gas and also by this means a condition may be sustained for holding the lifted mass of mixed phases in the settler section thereby delaying the return so as to allow settling time.

The invention will be further described with reference to one particular form of mixer settler apparatus in accordance with the invention which is illustrated by way of example in the accompanying diagrammatic drawings in which:

FIGURE 1 is an elevational view, partly sectioned, of a portion of the apparatus, and FIGURE 2 is a view as seen in the direction of arrow A in FIGURE 1.

There are a number of mixing tanks arranged on one level and an equal number of separation vessels 12 arranged on a higher level. Flow connections in the form of pipes 13, 14 establish an alternating relationship between the tanks and the vessels, and in the direction from the end which terminates with a mixing tank, that is to say, in the direction indicated by the arrow A, the flow connection 13 of each separation vessel with the preceding mixing tank is of wider bore than the connection 14 with the following tank. The wider bore connection opens laterally into the respective separation vessel at a higher level than the entry of the narrower bore connection. To enable lifting by gas displacement from the mixing tanks to the separation vessels, each of the latter is connectable through a pipe 15 with a low pressure line 16 and the wide and narrow bore flow connections dip deep into the mixing tanks to points below the normal liquid level which in the present case is determined by means of pipes 17 interconnecting the tanks directly. For agitating the contents of the mixing tanks, it is preferred to include in each tank a pulsing arrangement composed of two or more dip tubes which suck up and expel the tank contents, the one in a 180° out of phase relationship with the other. Thus, as illustrated, there are in each tank two tubes 18 which suck and expel by pulses applied in an opposite phase relationship to pulses causing sucking and expelling in tubes 19 penetrating to a deeper level. The base 20 of each tank is profiled by machining from solid to avoid corners in which the contents may stagnate.

In its intended application to the leaching with nitric acid of the unconsumed fissile material in irradiated cermet nuclear fuel having stainless steel as the matrix, the above described apparatus is combined with a machine for breaking down the solid fuel to a comminuted form. For example, such machine may comminute by crushing, or take the form of a milling machine of which the cutter is capable of taking thin cuts of the order of one-thousandth of an inch.

The comminuted cermet is fed to the terminal mixing tank continuously or semi-continuously, for example with a vibratory conveyor, and by the action of the pulsing arrangement is mixed thoroughly with nitric acid in the tank. The separation vessels are connected simultaneously, with the possible exception of those at the ends, to low pressure in the line 16 in accordance with a cycle, the low pressure made available in the line being calculated to lift into each separation vessel a quantity of mixed phases which is predetermined on the basis of the proportion of phases during normal operation to bring the sedimentary content below the level of the laterally entering wide bore connection 14 when settling has taken place. The cycle, which is continuously repeated, is such that each vessel is held for a first period at the normal system pressure and held for a second period in the low pressure condition. During the first period, the vessel is empty or being emptied; at the start of the second period, the predetermined quantity of mixed phases in a slurry consistency is drawn preferentially through the wide bore connection 13 from the preceding mixing tank into each vessel, the amount reaching the vessel from the following mixing tank being restricted by the narrow bore of the flow connection 14 leading to it. For the remainder of the second period, the uptake into the separation vessel is allowed to settle into an upper layer of light phase liquid and a lower layer of heavy phase sediment. On release of the evacuated condition at the end of the second period, the upper liquid layer discharges back to the preceding mixing tank through the wide bore flow connection 13 and the lower sedimentary layer discharges gradually with a smaller volume of liquid phase through the narrow bore flow connection 14 to the following mixing tank. Thus, the comminuted solid is progressed as a slurry through the alternating mixing tanks and separation vessels and the residue remaining when the terminal separating vessel is reached is drained off for disposal, any liquid accompanying it being at this end of the apparatus almost, if not completely, deficient of leached material. The drained-off residue is preferably washed with water to remove acid and any residual traces of soluble matter and is then fed to a rotary drum filter or other solid-liquid separator capable of discharging the solids in a semi-dry condition. If, by way of example, the residence time in the separation vessels is between 20 and 30 seconds, the cycle period may be of the order of two minutes. Control of the cycle is conveniently by means of a time-sequence switching unit which controls the operation of electromagnetic valves.

The illustrated apparatus is intended for nuclear fuel of the kind having highly enriched uranium and/or plutonium, and therefore, as a precaution against criticality hazards, the tanks and vessels are designed to be safe by shape with respect to a given maximum concentration of fissile material. A suitable number of stages is between eight and twelve. To assist the leaching process, heat is supplied, as by steam jackets 21, to maintain a temperature of about 90° C. at least in the first two or three of the mixing tanks. With only the first two or three equipped with steam jackets, the remainder in effect operate as washing stages.

What we claim is:

1. Mixer settler apparatus for contacting phases of differing densities and comprising mixer sections, means to agitate the contents of each mixer section settler sections at a higher level than the mixer sections, means for lifting from each mixer section into an associated one of the settler sections a predetermined quantity of mixed phases, a conduit extending between each mixer section and its associated settler section and opening into the latter in the region where separation of the phases of said quantity occurs on settling, a second conduit presenting greater resistance to flow than the previously mentioned conduit and extending from each mixer section to the bottom of a settler section associated with a preceding mixer section, and means for retaining the lifted quantities in the settler sections to enable settling of the phases prior to discharge through the conduits.

2. Mixer settler apparatus for contacting phases of differing densities and comprising mixer sections, means to agitate the contents of each mixer section settler sections at a higher level than the mixer sections, a first conduit penetrating deep into each mixer section and extending to an associated settler section into which it opens in the region where separation will ocur, on settling, in a predetermined quantity of mixed phases lifted into the settler section, a second conduit presenting greater resistance to flow than the first conduit and extending from the bottom of each settler to a mixer section following that with which the settler section is associated, a source of low pressure gas, and means for establishing communication selectively between the settler sections and said source so as to cause by gas displacement the lifting into these sections of the aforementioned predetermined quantity of mixed phases predominantly through the first conduit on account of its resistance to flow being less than that of the second conduit.

3. Mixer settler apparatus as set forth in claim 2, wherein the first conduit opening into each settler section is of larger flow cross section than the second conduit extending from the same settler section.

References Cited by the Examiner

UNITED STATES PATENTS

| | | | |
|---|---|---|---|
| 889,120 | 5/1908 | Gormly | 23—267 |
| 1,092,384 | 4/1914 | Nickels | 23—292 XR |
| 1,517,689 | 12/1924 | Welch | 23—267 XR |
| 2,048,305 | 7/1936 | Ubbelohde | 23—292 |
| 2,594,675 | 4/1952 | Norell | 23—267 XR |
| 2,790,701 | 4/1957 | Kamen | 23—312 XR |
| 2,859,091 | 11/1958 | Winters | 23—312 XR |

NORMAN YUDKOFF, *Primary Examiner.*